July 11, 1967     P. T. SCHARF ETAL     3,330,681
LOW REFLECTION COATINGS FOR PLASTICS
Filed July 15, 1963
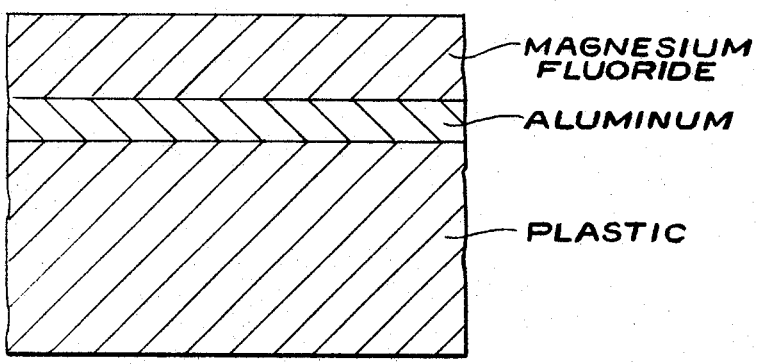
Philip T. Scharf
William J. Keenan
INVENTORS
BY R. Frank Smith
Ogden H. Webster
ATTORNEYS 3,330,681
LOW REFLECTION COATINGS FOR PLASTICS
Philip T. Scharf and William J. Keenan, Rochester, N.Y., assignors to Eastman Kodak Company, Rochester, N.Y., a corporation of New Jersey
Filed July 15, 1963, Ser. No. 294,887
4 Claims. (Cl. 117—33.3)

This invention relates to plastics having coatings thereon which substantially reduce light reflections from the surface thereof.

It is desirable to provide low reflection coatings for various plastic objects, such as camera lenses, ophthalmic lenses, optical filters, windows and the like. However, previous low reflection coatings for plastics have been unsatisfactory for various reasons.

U.S. Patent 2,366,687 states that plastics may be coated with a metal layer, such as aluminum, $\frac{1}{100}$–$\frac{1}{10}$ of a wavelength physical thickness i.e. 5 m$\mu$ to 50 m$\mu$, and a coating thereover of quartz, beryl, albite or corundum having an optical thickness of $\frac{1}{8}$ to $\frac{3}{4}$ wavelength of light, to provide low reflection coatings. However low reflection coatings applied to the surface of plastic objects in accordance with this teaching, have "crazed," rendering the plastic object so coated entirely unsuitable for most applications. Moreover, since the refractive index of quartz, beryl, albite and corundum are all as high as, or higher, than the common transparent plastics, it has been found that the metal layer must be at least 10 m$\mu$ in thickness to provide reduction of reflection. When the metallic coatings are as thin as 5 m$\mu$, as taught in the patent, no reduction of reflection is achieved with quartz, beryl, albite or corundum. Indeed, such coatings over the thin metal coating act not as reflecting reducing coatings, but as reflecting increasing coatings.

The thickness of the metal coating is of particular significance since the thicker the coating, the greater the light absorption thereof. Metal coatings thick enough to allow quartz, beryl, albite or corundum to operate as low reflection coatings for plastics absorb considerable amounts of light, for instance on the order of 10%. This is particularly undesirable in many applications, such as camera lenses.

In addition to the foregoing disadvantages, the prior art low reflection coatings are not sufficiently durable for many applications.

Finally, quartz, beryl and corundum have such high evaporation temperatures that it is difficult to apply the coatings to plastics by conventional techniques without damaging the plastic.

One object of our invention is to provide low reflection coatings for plastics. Another object of our invention is to provide plastics having low reflection coatings thereon which absorb insignificant amounts of light. A further object of our invention is to provide low reflection coatings for plastics which do not craze. Still another object of our invention is to provide low reflection coatings for plastics, which have good durability. Other objects of our invention will appear herein.

These and other objects of our invention are accomplished by coating plastic objects with an aluminum coating about 2–5 m$\mu$ thick, and coating thereover magnesium fluoride having an optical thickness of about $\frac{1}{4}$ wavelength of light.

We have found that the low reflection coatings in accordance with our invention effectively reduce reflectance from plastic surfaces, absorb insignificant amounts of light, do not craze and are durable.

The drawing is a cross-sectional view, greatly enlarged, of a plastic body having coated thereon a thin aluminum coating and a magnesium fluoride coating thereover.

Our invention will be further illustrated in Examples 1 and 2.

*Example 1*

A lens composed of polymethyl methacrylate was heated to 140° F. in a vacuum chamber and coated with aluminum about 4 m$\mu$ thick by evaporating the aluminum in the vacuum chamber. Thereafter the lens was coated with magnesium fluoride to produce a coating $\frac{1}{4}$ wavelength of light thick by evaporating the magesium fluoride. The coated lens thus obtained showed reduction in the reflection of light. The layer of aluminum was sufficiently thin that the amount of light absorbed thereby was insignificant. The coating showed no tendency to craze, even after subjection to 30 thermal shocks from —5° C. to 85° C. The lens coating had excellent durability.

*Example 2*

The procedure of Example 1 was followed except that a polystyrene lens was substituted for the polymethyl methacrylate lens of Example 1. Essentially the same results were obtained.

The following examples show plastic objects coated in accordance with the prior art.

*Examples 3–6*

Four polymethyl methacrylate lenses were coated, in the same manner as in Example 1, with aluminum at a thickness of 5 m$\mu$ and each lens was then given a coating of one of the following: quartz, beryl, albite and corundum, at $\frac{1}{4}$ wavelength of light thickness. The coated plastic lenses thus obtained had a higher reflection than the uncoated plastic lenses. The coating crazed after being subjected to three thermal shocks from —5° C. to 80° C., and durability was poor.

*Examples 7–10*

The procedure of Examples 3–6 was followed except that the aluminum coating was applied at about $\frac{1}{25}$ wavelength of light. Although these coatings did reduce reflection of light from the plastic surfaces, the aluminum layer was so thick that it absorbed approximately 10% of the light striking the plastic surface. The coatings crazed after three thermal shocks from —5° C. to 80° C., and durability was poor.

Accordingly, it may be seen from the above examples that coatings in accordance with the prior art fail to produce satisfactory results as low reflection coatings for plastic, but that coatings in accordance with the invention provide excellent low reflection coatings of good durability, without craze or absorption of excessive amounts of light.

The coatings of our invention may be applied in any suitable manner, and preferably by placing the plastic to be coated in a vacuum chamber and evaporating aluminum and then magnesium fluoride. During the coating operation, the plastic body is heated as much as possible without causing deformation of the plastic or excessive evolution of gases therefrom. Optimum temperatures thus vary for the type of plastic being coated. When it is impractical to heat the plastic, acceptable durability of the coatings of the invention may be obtained (1) by using vacuum equipment having greater pumping capacity than normal, (2) by carrying out the evaporation at a lower pressure level. When the plastic is not heated, evaporation preferably is carried out at a pressure below $5 \times 10^{-5}$, although normally evaporation may be performed between $1 \times 10^{-4}$ and $5 \times 10^{-5}$.

As noted above, plastic objects coated in accordance with our invention are highly useful in a number of applications, including camera lenses, optical filters, windows and the like. Preferably, the coatings are applied over a clear, transparent plastic object. However, if desired, the plastic object may be tinted.

We have found that the color of the light transmitted through the coated plastic articles may be controlled somewhat by adjusting the thickness of the magnesium fluoride layer. Thus, a thin layer (¼λ at 400 mμ) of magnesium fluoride has been found to produce a camera lens termed "cold" in photographic parlance, whereas a heavy layer (¼λ at 600 mμ) has been found to produce a "warm" lens. This property is quantitatively measured by Color Contribution as defined in American Standard PH3.337—1961.

We claim:
1. An article of manufacture comprising a shaped plastic object, a coating of magnesium fluoride thereover approximately ¼ wavelength of light in optical thickness, and an aluminum coating 2–5 mμ thick forming a bond between the plastic article and the magnesium fluoride coating, whereby the tendency of the magnesium fluoride coating to craze due to thermal expansion of the plastic article is reduced.

2. An article of manufacture comprising a clear, transparent polymethyl methacrylate article, a coating of magnesium fluoride thereover ¼ wavelength of light in optical thickness, and an aluminum coating 2–5 mμ thick forming a bond between said article and the magnesium fluoride coating, whereby the tendency of the magnesium fluoride coating to craze due to thermal expansion of said article is reduced.

3. An article of manufacture comprising a clear, transparent polystyrene article, a coating of magnesium fluoride thereover ¼ wavelength of light in optical thickness, and an aluminum coating 2–5 mμ thick forming a bond between said article and the magnesium fluoride coating, whereby the tendency of the magnesium fluoride coating to craze due to thermal expansion of said article is reduced.

4. A clear, transparent plastic lens, a coating of magnesium fluoride thereover ¼ wavelength of light in optical thickness, and an aluminum coating 2–5 mμ thick forming a bond between the lens and the magnesium fluoride coating, whereby the tendency of the magnesium fluoride coating to craze due to thermal expansion of the plastic lens is reduced.

References Cited
UNITED STATES PATENTS

| | | | |
|---|---|---|---|
| 2,366,687 | 1/1945 | Osterberg | 117—71 |
| 2,590,906 | 4/1952 | Tripp | 117—71 |
| 2,617,748 | 11/1952 | Bjorksten et al. | 117—33.3 |
| 2,676,114 | 4/1954 | Barkley | 117—33.3 |
| 2,912,351 | 11/1959 | Danner et al. | 117—33.3 |
| 3,147,132 | 9/1964 | Geffcken | 117—33.3 |
| 3,235,397 | 2/1966 | Millendorfer | 117—33.3 |
| 3,254,253 | 5/1966 | Davis et al. | 117—33.3 X |

WILLIAM D. MARTIN, *Primary Examiner.*

S. W. ROTHSTEIN, W. D. HERRICK,
*Assistant Examiners.*